UNITED STATES PATENT OFFICE.

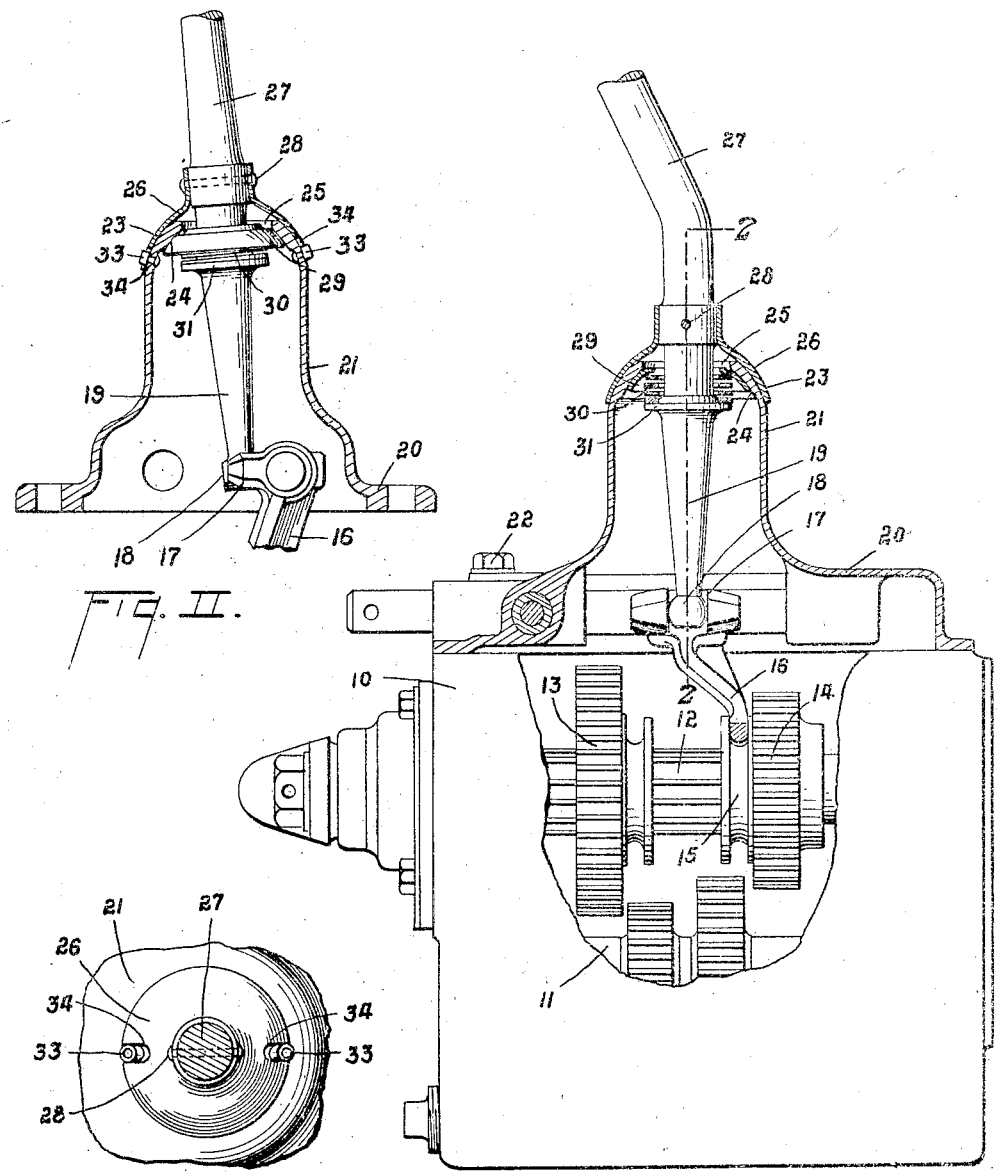

CHARLES R. SHORT, OF DETROIT, MICHIGAN, ASSIGNOR TO GENERAL MOTORS COMPANY, OF DETROIT, MICHIGAN, A CORPORATION OF NEW JERSEY.

GEAR-SHIFTING LEVER.

1,330,912.  Specification of Letters Patent.  Patented Feb. 17, 1920.

Application filed April 21, 1917. Serial No. 163,752.

*To all whom it may concern:*

Be it known that I, CHARLES R. SHORT, a subject of the King of Great Britain, and resident of Detroit, Wayne county, State of Michigan, have invented certain new and useful Improvements in Gear-Shifting Levers, of which the following is a specification.

This invention relates to motor vehicles, and particularly to an improved mounting of shiftable levers therefor.

One of the objects of this invention, is to provide a very simple mounting for shifting levers, which may be constructed comparatively cheap, and of parts which are preferably stamped or forged, resulting in a very light and compact assembly.

These, and various other objects, will clearly appear from the following description, taken in connection with the accompanying drawings which form a part of this specification, and in which:

Figure 1 is a side elevation, with portions broken away, of a motor vehicle gear box, embodying a preferred form of my invention.

Fig. 2 is a transverse vertical section substantially along the line 2—2 of Fig. 1, showing the shifting lever tilted; and Fig. 3 is a plan view of my invention with a part of the lever broken away.

Referring to the drawings, 10 is a motor vehicle gear box adapted to house a change speed gearing, comprising a countershaft 11 and a driving shaft 12, having a pair of gears 13 and 14 splined thereon against relative rotational movements, but adapted for a sliding movement thereon. Each of the slidable gears 13 and 14 respectively, is provided with a grooved collar 15 in which may be mounted a shifting fork 16, formed with a slotted portion 17, which is adapted to be engaged by the lower ball end 18 of a shifting lever 19.

A cover 20 having an upwardly extending pedestal 21 may be suitably secured to the gear box 10, as by bolts 22. The pedestal 21 is formed exteriorly and interiorly thereof adjacent its upper end with hemispherical dome surfaces 23 and 24 respectively. The shifting lever 19 is adapted to be inserted in the hollow pedestal 21 through the upper dome opening 25.

A hemispherical shaped cap member 26, preferably formed of a stamping is adapted to be slipped over the handle portion 27 of the shifting lever 19 and to rest on the spherical or ball surface 23 of the pedestal. This member is adapted to be secured to the lever by suitable means such as a pin 28, these parts forming a ball and socket connection.

The lever 19 is yieldingly seated against an upward movement by arranging another hemispherical shaped head member 29 against the interiorly formed dome surface 24. This head member being held in position by suitable means such as a spring 30, the lower end of which may abut against a shoulder 31 shown as formed integral with the lower end of the lever.

Means for preventing the rotation of the lever relative to the pedestal may be provided in the form of a plurality of pins 33, suitably riveted in the pedestal with the slotted portions 34, which are formed in the cap member 26 surrounding the same. With this construction it will be noted that the head and cap members may be oscillated relative to the pedestal dome while being prevented from relative rotation thereon.

It will be noted that I have provided a mounting which comprises very simply constructed members, yieldingly mounted on the hollow pedestal member, and that the gear shifter lever is practically floated therein.

While I have described and will specifically claim what I deem to be a preferred embodiment of my invention, it will be obvious to those skilled in the art, that various modifications and changes may be made without departing from the spirit and scope hereof.

Having thus described my invention, what I claim and desire to secure by Letters Patent is:

1. In a device of the class described, the combination of a hollow pedestal having a dome with a central opening, a tiltable lever projecting through the opening therein, and means carried by said lever for supporting the same on said dome.

2. The combination of a hollow pedestal having a dome with an opening formed therein, a tiltable lever adapted to be passed through said opening, a member arranged between said dome and said lever and carried by said lever, and means for yieldingly maintaining said member against said dome.

3. The combination of a hollow open ended pedestal, formed interiorly and exteriorly thereof, with hemispherical surfaces, complementary members adapted to rest against said surfaces, means for securing one of said members to said lever, and yielding means between the other member and said lever for maintaining both of said members in contact with said surfaces to float said lever thereon.

4. The combination of a hollow open ended pedestal having a hemispherical surface formed exteriorly thereof, a lever adapted to be passed through said opening, a cap member connected to said lever and resting on said spherical surface, and means for yieldingly maintaining said cap member on said pedestal to support said lever thereon.

5. The combination of a hollow open ended pedestal having formed exteriorly and interiorly thereof oppositely disposed hemispherical surfaces, a lever adapted to be passed through said opening, members adapted to be arranged against each of said surfaces, and means comprising a spring device for supporting said lever in said pedestal in a tiltable relation.

6. A gear shift mechanism comprising a hollow open ended pedestal formed with interiorly and exteriorly disposed hemispherical surfaces, members adapted to rest against each of said surfaces, one of said members being fixed to said lever, and yielding means between the other member and said lever, said members forming the sole support of said lever.

7. A gear shifting device comprising a gear box, a hollow open ended pedestal arranged thereon, and formed exteriorly and interiorly thereof with oppositely disposed hemispherical surfaces, a tiltable lever adapted to be passed through said opening, a cap member secured to said lever and adapted to be supported on said outside spherical surface, a head member adapted to be arranged against said inside spherical surface, a collar arranged on said lever and a spring between said collar and said latter mentioned cap member, whereby said lever is supported in said pedestal.

8. A gear shifting device comprising a gear box, a hollow open ended pedestal mounted thereon, and formed with an outside and an inside hemispherical surface, a pair of stampings arranged against each of said surfaces, a lever adapted to be passed through said opening, one of said stampings being secured to said lever, and spring means between the other stamping and said lever whereby said lever is supported in said pedestal.

9. The combination of a hollow open ended pedestal having a spherical surface formed thereon, a tiltable lever adapted to be passed through said opening, a cap member secured to said lever and adapted to rest on said surface, and means for preventing relative rotational movement between said cap and said pedestal, while permitting relative tilting motions therebetween.

10. The combination of a hollow open ended pedestal having a hemispherical surface formed exteriorly thereof, a tiltable lever adapted to be passed through said opening, a cap member secured to said lever and adapted to rest on said surface, said cap member having a slot formed therein, a pin arranged in said slot and secured to said pedestal for preventing relative rotational movements between said cap member and said pedestal while permitting relative tilting movements therebetween.

In testimony whereof I affix my signature.

CHARLES R. SHORT.